United States Patent [19]

Srivastava

[11] 4,285,005
[45] Aug. 18, 1981

[54] COLOR CORRECTION CIRCUIT FOR A COLOR TELEVISION RECEIVER

[75] Inventor: Gopal K. Srivastava, Buffalo Grove, Ill.

[73] Assignee: Zenith Radio Corporation, Glenview, Ill.

[21] Appl. No.: 167,989

[22] Filed: Jul. 14, 1980

Related U.S. Application Data

[63] Continuation-in-part of Ser. No. 970,700, Dec. 18, 1978, Pat. No. 4,219,840.

[51] Int. Cl.³ .............................................. H04N 9/535
[52] U.S. Cl. ....................................................... 358/28
[58] Field of Search ........................................... 358/28

[56] References Cited

U.S. PATENT DOCUMENTS

3,749,825  7/1973  Moore ..................................... 358/28

Primary Examiner—Robert L. Richardson

[57] ABSTRACT

A color correction circuit is described for use in a color television receiver of the type which includes a B-Y demodulator and a network for sensing color-difference signals which are representative of hues within a selected range of fleshtones. In the preferred embodiment, the color correction circuit includes a voltage follower which is activated by the sensing network and which is coupled to opposite polarity outputs of the B-Y demodulator. When the network senses the presence of color-difference signals within the fleshtone range, the voltage follower is activated to combine a portion of one B-Y color-difference signal with the opposite polarity color-difference signal so as to develop a resultant B-Y signal of a reduced amplitude. At the same time, an offset current is automatically added to the resultant B-Y signal for off-setting the hues associated with the latter signal toward the fleshtone axis.

5 Claims, 6 Drawing Figures

COLOR CORRECTION CIRCUIT FOR A COLOR TELEVISION RECEIVER

CROSS REFERENCE TO RELATED APPLICATION

This application is a continuation-in-part of application Ser. No. 970,700, filed Dec. 18, 1978, issued as U.S. Pat. No. 4,219,840.

BACKGROUND OF THE INVENTION

This invention is directed generally to color television receivers, and more particularly to automatic color correction circuits for use in such receivers.

Modern television receivers commonly use some form of a color correction circuit, sometimes referred to as an "automatic tint control", to ensure that reproduced fleshtones appear to a viewer with the proper tint or hue. Some such circuits operate to change the phase of either the 3.58 megahertz reference signal and/or the 3.58 megahertz chroma signal to shift the phase of selected chroma signals toward fleshtone. Such phase-shifting type circuits typically include coils, capacitors and the like which cannot be fabricated on integrated circuits. Consequently, the use of such circuits in modern television receivers, which tend to be constructed using more integrated circuit chips is disadvantageous from a cost standpoint.

Several approaches have been proposed for correcting fleshtones by operating on chroma signals subsequent to their demodulation, thereby generally avoiding or at least reducing the number of coils and capacitors required for color correction. For example, U.S. Pat. No. 3,798,352 makes use of demodulated (B-Y) and (R-Y) color-difference signals for generating an error signal to modify the chroma signals. However, that disclosed structure requires variable resistors for accurately "setting up" the circuit. Because variable resistors are not readily fabricated on integrated circuits, its drawback is obvious for the reasons given above. In addition the range over which color correction occurs is sensitive to the amplitude of the color signals, thereby causing the correction range to be undesireably variable.

Another proposal for operating on demodulated chroma signals is disclosed in U.S. Pat. No. 3,749,825. According to this latter patent, demodulated (R-Y) and (G-Y) color difference signals are selectively combined to produce a correction signal which is applied to the demodulated (B-Y) color difference signal. However, the disclosed arrangement for developing the correction signal is somewhat sensitive to the D.C. quiescent voltages to which the color difference signals are reference. Moreover, accurate set-up of the disclosed circuit requires a variable resistor which is not readily fabricated on an integrated circuit.

U.S. Pat. No. 3,821,790 describes a color correction circuit which combines the outputs of the (R-Y) and (B-Y) demodulators so as to alter their relative gain and develop a phase-shift when color correction is desired. Such correction is based on varying the A.C. impedance in (R-Y) and (B-Y) amplifiers, which impedance is developed by at least one capacitor which cannot be readily fabricated by integrated circuit technology.

Another aspect which is common to the prior art discussed above is that those color correctors operate in an "open loop" mode as opposed to a "closed loop" or feedback mode. Consequently, the degree of correction which they provide tends to vary from unit to unit rather than giving predictable and reproducible correction results.

For the foregoing reasons, prior color correction circuits have not been entirely satisfactory and have been largely unadaptable for fabrication on integrated circuit chips. Hence, their inclusion in television receivers utilizing integrated circuit technology remains undesireable, at least from a cost standpoint.

OBJECTS OF THE INVENTION

It is a general object of the invention to provide an improved color correction circuit which overcomes the deficiencies noted above.

It is a more specific objection of the invention to provide a color correction circuit which is readily fabricated with integrated circuit technology.

It is a further objection of the invention to provide such a color correction circuit which maintains proper fleshtones and avoids altering colors far removed from flesh-tones, such as greens and blues.

BRIEF DESCRIPTION OF THE FIGURES

The above-stated objects and other objects of the invention are more particularly set forth in the following detailed description and in the accompanying drawings of which.

DESCRIPTION OF THE PREFERRED EMBODIMENT

One of the principles utilized by the invention is that undesirable fleshtone variations can be reduced by altering only the (B-Y) color-difference signal. In addition, it has been found that unnatural purplish casts in a fleshtone are substantially removed by reducing the (B-Y) component thereof. When the fleshtone appears unnaturally green, a substantial negative (B-Y) component is present so that a reduction in the level of the negative (B-Y) component improves the reproduced fleshtone. This effect is more readily explained by reference to the conventional phase diagram shown in FIG. 1.

Figure 1:
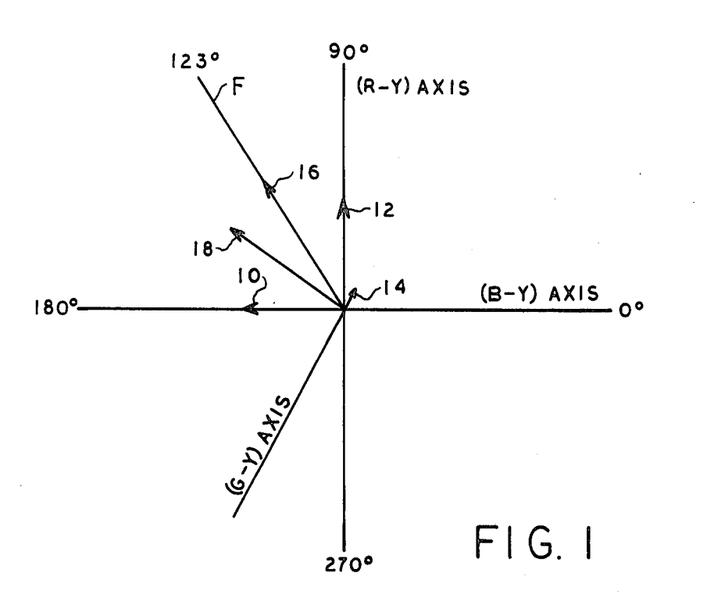
FIG. 1 is a color phase diagram useful in explaining certain aspects of the invention.

As shown, the (B-Y) axis is displaced by 90° from the (R-Y) axis. The (G-Y) axis is in the third quadrant of the diagram. A flesh vector comprises the vector resultant of (R-Y), (B-Y) and (G-Y) components and, when proper fleshtones are produced, the resultant lies along the fleshtone axis F. To produce a correct fleshtone vector, the (B-Y) component thereof is negative and has an amplitude as indicated by the arrowhead 10, the (R-Y) component is positive and has an amplitude as indicated by the arrowhead 12, and the (G-Y) component is negative and has an amplitude as indicated by the arrowhead 14. The resultant of those vector components is the vector 16 which lies on the fleshtone axis F.

When fleshtones are too green, as shown by the vector 18, that result is obtained largely because the negative (B-Y) component has increased in amplitude. Hence, a degrease in the amplitude of the (B-Y) vector causes the vector 18 to rotate clockwise toward the fleshtone axis F. Similarly, when fleshtones are too blue or purple, that result is substantially due to a large positive (B-Y) component. Accordingly, reducing the amplitude of the (B-Y) component under those circumstances shifts the resultant fleshtone vector toward the axis F.

Another factor taken into account by the invention is that reduction in the amplitude of the (B-Y) component does not necessarily ensure that the resultant fleshtone vector will be exactly along the axis F. Hence, according to one aspect of the invention, an offset signal is added to the (B-Y) component to ensure that chroma signals within a designated range of the axis F are shifted toward that axis. Such color correction is accomplished by a reliable and versatile correction circuit which is readily fabricated by integrated circuit technology.

Figure 2:
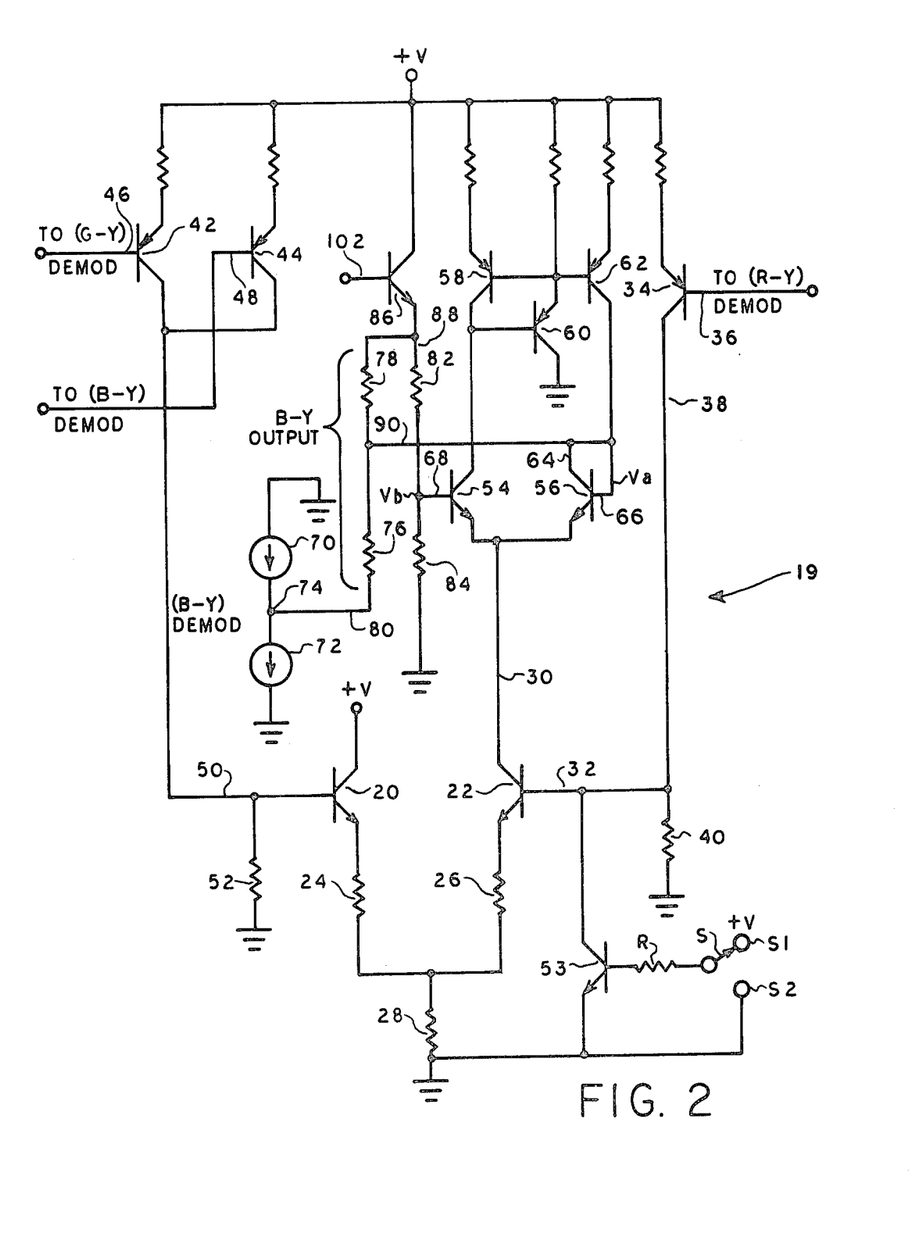
FIG. 2 is a circuit diagram illustrating the preferred embodiment of the color correction circuit according to the invention of my above-mentioned copending application.

Referring now to FIG. 2, a preferred circuit arrangement is shown for effecting the functions described above in accordance with the invention described in my copending application. The color corrector is designated generally as 19 and includes a control signal generating means, comprising a pair of transistors 20 and 22, for generating a control signal in response to demodulator outputs indicative of reception of chroma signals in a selected phase range encompassing the fleshtone axis F. As shown, the transistors 20 and 22 are coupled in a differential amplifier configuration with emitter resistors 24, 26, and 28. Hence, one of the transistors 20, 22 will always be conducting. In the illustrated embodiment, only the transistor 20 conducts when no color correction is to take place, and the transistor 22 conducts for developing a control signal in its collector lead 30 when correction is to take place. Thus, the transistors 20 and 22 and their associated circuit components act as an electronic switch for automatically enabling and disabling color correction.

To selectively actuate the transistor 22 when color correction is desired, the base terminal 32 of the latter transistor receives a demodulated (R-Y) color difference signal. That signal is generated by a transistor 34 whose base terminal 36 receives the output of the (R-Y) demodulator. The transistor 34 develops a corresponding collector current in the lead 38 for developing a corresponding voltage across a resistor 40. The latter resistor is coupled between ground and the base terminal of the transistor 22 so that an (R-Y) color difference signal is applied to the transistor 22.

In a similar manner, transistors 42 and 44 are coupled to the outputs of the (G-Y) and (B-Y) demodulators via their respective base terminals 46 and 48. The collector terminals of the transistors 44 and 46 are tied together and coupled via a lead 50 to the base terminal of the transistor 20, with a resistor 52 coupled between ground and the lead 50. By virtue of this arrangement, the voltage at the base terminal of the transistor 20 corresponds to the sum of the (G-Y) and (B-Y) color difference signals. It will be appreciated, therefore, that whenever the instantaneous value of the (R-Y) color difference signal is greater than the instantaneous sum of the (G-Y) and (B-Y) color difference signals, the transistor 22 conducts for generating the control signal on the lead 30. Hence, the control signal is generated only for chroma signals whose phase is on either side of and within a selected range of the fleshtone axis F.

To ensure that the transistor 22 remains off when no chroma signals are received, as during a black and white transmission, advantage is taken of the fact that the outputs of chroma demodulators ordinarily include a color difference signal superimposed on a known D.C. voltage level. By applying a smaller amount of that D.C. voltage to the base terminal of the transistor 22 than to the base terminal of the transistor 20, the transistor 22 is held off during black and white transmission. In addition, the range over which the transistor 22 conducts is thereby further limited so that chroma signals whose phase is far removed from the fleshtone axis are not corrected.

In the illustrated embodiment, the last mentioned function is achieved by selecting proper values for the resistors 52 and 40. Because quiescent currents from both the (G-Y) demodulator and the (B-Y) demodulator flow in the resistor 52, whereas only a single quiescent demodulator current flows in the resistor 40, the value of the resistor 52 is selected to be slightly greater than one-half the value of the resistor 40. Thus, the D.C. quiescent voltage at the base of the transistor 20 is caused to be greater than the D.C. quiescent voltage at the base terminal of the transistor 22. Where that difference is about 300 millivolts, the range over which the transistor 22 conducts has been found to be about 140 millivolts. That range may, of course, be changed by appropriate selection of resistors 40 and 52.

To permit an operator to turn the color correction circuit off and on as desired, the base terminal of the transistor 22 may be coupled to the collector terminal of another transistor 53. The base terminal of the latter transistor is coupled to an operator actuator switch S via a resistor R. When the switch S engages contact $S_1$, a positive voltage is applied to the transistor 53 for turning it on, thereby grounding the base terminal of the transistor 22. Consequently, the transistor 22 remains off and no color correction is effected when the switch S engages the contact $S_1$. When the switch S engages the contact $S_2$, the base terminal of the transistor 53 is grounded, transistor 53 turns off, and transistor 22 is allowed to turn on in response to color difference signals of the appropriate amplitude.

In response to the occurrence of the control signal on the lead 30, a color modifier, including transistors 54 and 56, modifies the gain of the (B-Y) demodulator such that the output thereof is reduced by a predetermined factor, thereby effecting a shift in the effective phase of demodulated chroma signals occurring within the range of correction. It will be understood that the term "phase" is generally used with reference to chroma signals prior to their demodulation as shown, for example, in FIG. 1. However, the modification of the (B-Y) signal and its effect on the reproduced image is more conveniently expressed in terms of "effective" phase change.

As shown, the transistors 54 and 56 are coupled in a differential amplifier configuration, their emitters being tied to the lead 30. Hence, the transistors 54 and 56 are "on" only when the control signal is present and color correction is effected then.

Gain reduction of the (B-Y) demodulator is achieved in the illustrated embodiment by modifying the load impedance across which the (B-Y) signal is generated. Such modifications occur automatically whenever the transistors 54 and 56 are turned on by the control signal.

To effect such modification, the collector circuits of the transistors 54 and 56 are coupled in a feedback arrangement comprising transistors 58, 60 and 62, with the collector terminal 64 of the transistor 56 being coupled to its base terminal 66. Suffice it to say at this juncture that the illustrated feedback arrangement operates to maintain the voltage $V_a$ at the base terminal 66 substantially equal to the voltage $V_b$ at a base terminal 68 of the transistor 54. As will be shown, this substantial identity between the values of $V_a$ and $V_b$ causes the load impedance (and the gain) of the (B-Y) demodulator to be reduced.

The output stage of a conventional (B-Y) demodulator is shown schematically as current sources 70 and 72. When a positive (B-Y) color difference signal is generated, the current source 70 may conduct. Conversely, when a negative (B-Y) color difference signal is generated, the current source 72 may conduct. To convert the current generated by the sources 70, 72 to a voltage, their common connection 74 is coupled to a (B-Y) load impedance comprising a plurality of serially connected impedances. In the illustrated embodiment, the (B-Y) demodulator load impedance includes resistors 76 and 78. One end of the load impedance is coupled to the output of the (B-Y) demodulator via a lead 80 and the other end thereof is coupled via a resistor 82 to the base input terminal of the transistor 54. The latter terminal is coupled through another resistor 84 to ground.

The demodulated (B-Y) output signal appears across the combination of the resistors 76 and 78. Hence, if the values of the resistors 76 and 78 are the same, and the resistor 78 is shunted, the gain of the (B-Y) demodulator is reduced by one-half. As will be shown, the operation of the transistors 54 and 56 causes the resistor 78 to be shunted so that the (B-Y) signal is developed across the resistor 76, thereby reducing the gain of the (B-Y) demodulator. The effect of the resistor 82 and another transistor 86 which is coupled to a junction 88 between the resistors 78 and 82 will be ignored for the moment.

Assuming for purposes of the present discussion that the value of the resistor 82 is negligibly small, the voltage $V_b$ at the base terminal of the transistor 54 is the same as the voltage at the junction 88. In addition, the voltage at the junction between the resistors 76 and 78 is equal to $V_a$ because of the coupling thereto by a lead 90. Hence, when the transistors 54 and 56 operate to maintain substantial equality between the voltages $V_a$ and $V_b$, there is substantially no voltage drop across the resistor 78. Thus, there is no current flow through the resistor 78 and it is essentially shunted. Accordingly, the load impedance for the (B-Y) demodulator is reduced to the value of the resistor 76, thereby reducing the gain of the (B-Y) demodulator. The operation of the circuitry including transistors 54 and 56 is, therefore, like an electronic switch which closes in response to the control signal for shunting the resistor 78.

Figure 3:
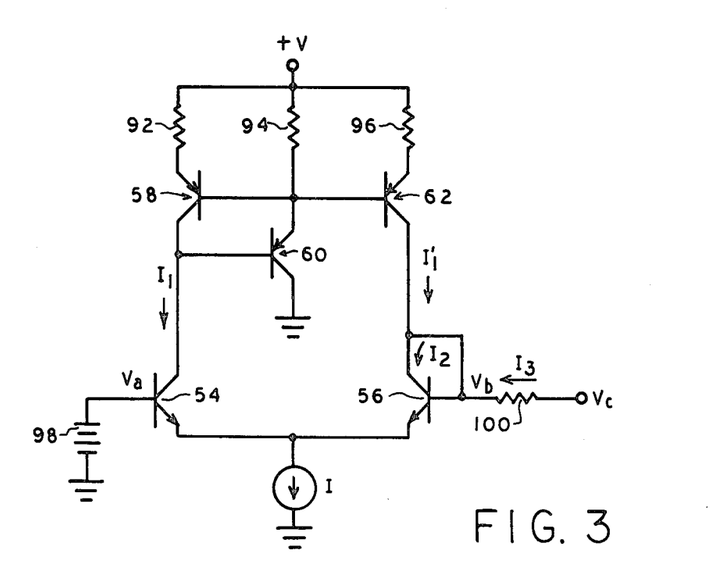
FIG. 3 is a circuit diagram of portions of the structure shown in FIG. 2, simplified to explain certain operative features of the preferred embodiment.

To better explain the way in which the voltages $V_a$ and $V_b$ are held substantially equal, reference is made to FIG. 3 wherein the transistors 54–62 are redrawn along with equivalent circuits for some of the remaining circuitry shown in FIG. 2. As shown, the emitters of the transistors 58, 60 and 62 are coupled via resistors 92, 94 and 96 to a voltage source +V. The voltage $V_a$ is represented by a battery 98 because the voltage applied to the base of the transistor 54 may be a D.C. voltage supplied by the emitter of the transistor 86 (FIG. 2). The voltage $V_c$ (FIG. 3) represents the equivalent open circuit voltage generated by the (B-V) demodulator on the lead 90 (FIG. 2), and the resistor 100 represents the equivalent impedance as seen by the base terminal of the transistor 56. Further $I_1$ and $I_1'$ identify the collector currents of the transistors 58 and 62, respectively; $I_2$ identifies the collector current of the transistor 56; and $I_3$ represents the current through the resistor 100.

It will be understood that the transistors 58 and 62 are coupled in the configuration of a so-called "current mirror" so that the currents $I_1$ and $I_1'$ are maintained at substantially equal levels.

Assuming that at a given instant $V_b$ equals $V_c$, the current $I_3$ will be zero. Consequently, $I_1'$ will equal $I_2$ and $I_2$ will equal $I_1$. Because the collector currents of transistors 54 and 56 are thus equal, their base voltages $V_a$ and $V_b$ are also necessarily equal because of the inherent operation of the differential amplifier configuration of the transistors 54 and 56.

If $V_c$ now rises higher than $V_a$ (and $V_b$), a current $I_3$ flows in the resistor 100. As a result, the current $I_2$ rises above the level of the current $I_1$. As the current $I_2$ increases, the current $I_1$ decreases because the sum of the currents $I_1$ and $I_2$ must remain equal to the source current I. The "current mirror" effect caused by the transistors 58, 60 and 62 then causes a corresponding decrease in the current $I_1'$. The net effect is that substantially the entire increase in $V_c$ is dropped across the resistor 100, thereby causing the base voltages $V_a$ and $V_b$ to remain equal. $V_b$ is hence "clamped" to $V_a$. Reference to FIG. 2 shows that this clamping action has the effect of shunting the resistor 78 so as to reduce the gain of the (B-Y) demodulator.

Looking at the operation of the transistors 54–62 from another standpoint, it can be seen that a "closed loop" or feedback type arrangement is provided for maintaining the corrected (B-Y) signal at a selected level. Specifically, the level of the (B-Y) signal at lead 90 is sensed by the transistor 56 so that any increase in that signal results in increased conduction in the transistor 56 and decreased conduction by the transistors 54 and 62, thereby holding the (B-Y) signal at lead 90 to the reference established at the base of the transistor 54. A decrease in the amplitude of the (B-Y) signal has a similar effect. Because of this feedback arrangement, the color correction developed is quite predictable and reproducible.

Turning now to a consideration of the transistor 86 shown in FIG. 2, it will be appreciated that the (B-Y) output across the load resistors 76 and 78 is a function of the voltage on the lead 80 as well as a function of whatever voltage is present at the emitter of the transistor 86. Similarly, the (R-Y) and (G-Y) demodulators may each have a load impedance coupled between current sources like 70 and 72 and the emitter of a transistor such as transistor 86. In the case where the base terminal 102 of the transistor 86 receives a D.C. voltage, that voltage will provide a D.C. reference upon which the (B-Y) signal is superimposed. With a similar configuration for the other demodulators, all color difference output signals will be referenced to the same D.C. voltage. Alternately, the transistor 86 may additionally receive the luminance or "Y" signal so that the output across resistors 78 and 76 is a "B" or blue signal rather than a color difference signal. Of course, the other demodulators will, in that case, also be configured to develop green and red signals.

An advantage of the illustrated connection of transistor 86 to the color difference load impedance is that, when color correction is effected, the axis toward which the corrected signals are shifted is easily selected. That selection is effected by the inclusion of the resistor 82 between the base terminal of the transistor 54 and the emitter terminal of the transistor 86. In effect, the inclusion of the resistors 82 and 84, and their illustrated connection to the (B-Y) demodulator and the transistor 86, adds a preselected voltage offset to the output of the (B-Y) demodulator simultaneously with the gain reduction of the (B-Y) demodulator. The value of the offset is, in this embodiment, determined by the value of the resistors 82 and 84. That value is selected such that demodulated chroma signals occurring within the color correction range are offset toward the fleshtone axis.

More specifically, it can be seen that if the value of resistor 82 is negligibly small, the voltage on the lead 90 will be substantially equal to the voltage at the emitter of the transistor 86 during color correction, due to the clamping by which $V_a$ is clamped to $V_b$. However, increasing the value of the resistor 82 lowers the voltage $V_b$ with respect to the voltage at the emitter of the transistor 86 by a predetermined amount. Hence, during color correction, the voltage $V_b$ is equal to the voltage at the emitter of the transistor 86 less the voltage drop across the resistor 82. Accordingly, the D.C. reference level of the (B-Y) color difference signal is offset downwardly by a fixed amount relative to the D.C. reference levels of the other color difference signals because those other color difference signals do not include such an offset.

The result of adding such an offset is to add a fixed negative (B-Y) component during color correction for shifting the axis of color correction toward the fleshtone axis. Such shifting has been found to be desirable because reducing the gain of the (B-Y) demodulator as previously described tends to correct colors to an axis closer to the (R-Y) axis. The offset described above then shifts the axis of correction counter-clockwise toward the fleshtone axis.

It will be appreciated that the inclusion of the offset in combination with gain reduction of the (B-Y) demodulator provides a very flexible system. For example, the amount of correction desired for a particular application is easily selected by choosing an appropriate amount of gain reduction for the (B-Y) demodulator. In the illustrated embodiment, such reduction is easily accomplished by choosing appropriate values for the resistors 76 and 78. In addition, the axis toward which colors are corrected is easily selected by choosing a desired amount of voltage offset, such as by choosing the appropriate value for the resistor 82. Hence, the amount of color correction and the axis of correction are easily selectable to meet various requirements and subjective determinations.

The illustrated embodiment provides color correction circuitry which is readily fabricated with integrated circuit technology. The amount of correction and the axis of correction depend primarily on the ratio of resistors. As is well known, such ratios are maintained well in integrated circuits. In addition, the use of differential amplifiers takes advantage of the fact that the transistors from which such amplifiers are constructed are well matched in integrated circuits. Their performance is very predictable and reliable, thereby providing a color correction circuit giving predictable and repeatable performance from receiver to receiver.

Figure 4:
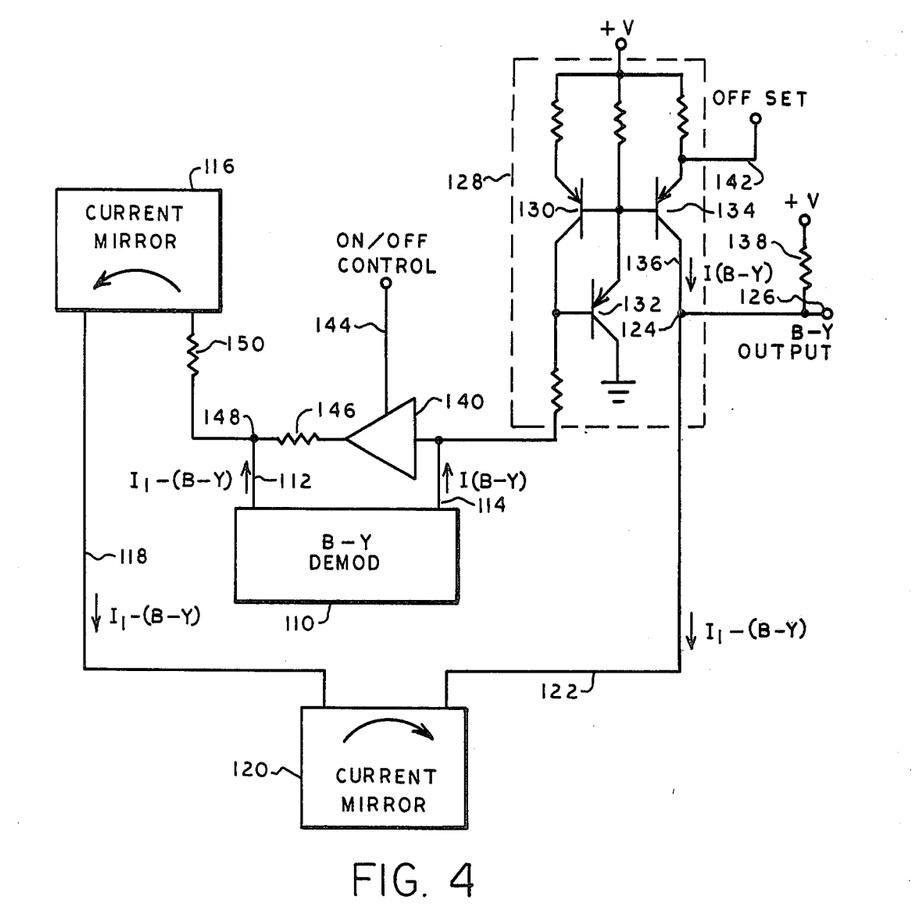
FIG. 4 is a circuit diagram illustrating a color correction network according to the present invention.

Referring now to FIG. 4, another color correction network is shown which embodies the present invention and which employs the general correction principals upon which the network of FIG. 2 operates. In FIG. 4, a B-Y demodulator 110 develops a pair of complimentary current outputs, designed as I-(B-Y) at a lead 112 and I (B-Y) at lead 114. The current in the lead 112 is applied to a current mirror 116 for developing a current $I_1$-(B-Y) in its output lead 118. When color correction as described below is not taking place, the current in the lead 118 corresponds to the current in the lead 112.

Another current mirror 120 receives the current in the lead 118 and develops a similar current $I_1$-(B-Y) in its output lead 122. The latter current is coupled via the lead 122 to a node 124 where it will be combined with additional I(B-Y) current to develop a B-Y output signal at terminal 126.

The other output of the B-Y demodulator is coupled via the lead 114 to the input of another current mirror 128 which includes transistors 130, 132 and 134. (The current mirrors 116 and 120 may be similar in construction to the mirror 128, except that the mirror 120 may employ NPN-type transistors). The illustrated interconnection of the transistors 130, 132 and 134 causes a current I(B-Y) to be developed in a lead 136. This current corresponds to the current developed by the demodulator at lead 114 and is coupled to the node 124 via the lead 136.

Also coupled to the node 124 is a load resistor 138, one end of which is coupled to a positive voltage source (+V). With this arrangement, a flow of current is developed from the node 124 to the voltage source (V+) which corresponds to I(B-Y) plus $I_1$-(B-Y). This current develops the B-Y color-difference output signal across resistor 138.

As thus far described, the complimentary output currents from the demodulator 110 have merely been converted to a color-difference output signal at terminal 126. The conversion thus effected by the current mirrors is not a part of the present invention, although it enables the color correction provided by the invention to be implemented in a relatively simple manner.

To effect color correction of the output signal, a voltage follower 140 is included for modifying the effective gain of the demodulator 110. An input lead 142 is also included for applying an offset current to the current mirror 128 so as to add a negative (B-Y) component to the output signal developed at the terminal 126.

Referring more specifically to the follower 140, it includes an input lead 144 for receiving an on/off control signal which may be developed as described hereinafter. Suffice it to say that the signal at lead 144 turns the follower 140 on to effect color-correction and turns it off when no color-correction is to occur.

The follower 140 receives as an input the positive B-Y signal developed at the demodulator's output lead 114 for developing a corresponding positive B-Y output voltage for application to a resistor 146. The resistor 146 is coupled at a node 148 to the demodulator's output lead 112 and to another resistor 150 through which an input current is coupled to the mirror 116. Hence at the node 148 a negative B-Y current from the lead 112 is summed with a positive B-Y current from the resistor 146. Because the currents received at the node 148 are of opposite polarity, a reduced amplitude negative B-Y current is received by the mirror 116, wherefore the current developed by the mirror 116 in the lead 118 has an amplitude which is reduced from that which occurs when no correction takes place. Consequently, the current in the lead 122 which is developed by the current mirror 120 is also reduced in amplitude, as is the color-difference signal developed at the output terminal 126.

The result obtained by the above-described reduction in the amplitude of the B-Y signal at terminal 126 is that the hues of color images developed from the reduced amplitude B-Y signal and non-corrected G-Y and R-Y color-difference signals are compressed toward the R-Y axis (+90 degrees). In order to bring the hues of the color images closer to the fleshtone axis, an offset current is applied to the lead 142 for coupling to the emitter of the transistor 134. The offset current thus received by the transistor 134 reduces its conduction and thereby reduces the amplitude of the current coupled to the node 124 via lead 136. This operation is equivalent to applying a negative B-Y current to the node 124 and the effect is to swing the hues of the corrected color images toward the fleshtone axis.

Referring again to the voltage follower 140, it may be of any conventional design which is adapted to be turned off and on by the signal at lead 144. For example, when correction is to take place, the signal at lead 144 may be the operating current which enables the follower 140. When no correction is to take place, the operating current in lead 144 may be terminated to turn off the follower 140. Of course, the operating current should be present only over a selected range of broadcast hues so that selective color correction is effected. In addition, the offset current received at lead 142 should occur simultaneously with turn on of the follower 140.

It will be appreciated that the operation of the correction network of FIG. 4 is not dependent on the type of circuit used to develop the on/off control and the offset current. Any suitable circuit may be used, although the preference is for the type of enabling network, shown in FIG. 5, to which reference is now made.

Figure 5:
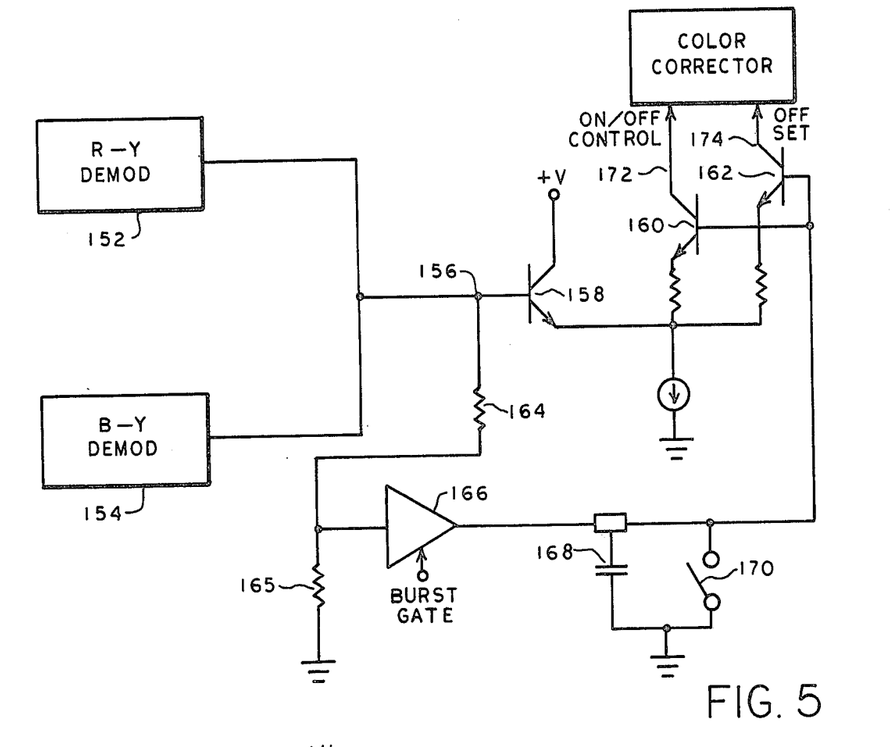
FIG. 5 illustrates an enabling network which may be used to activate the correction network of FIG. 4.

In FIG. 5, an enabling network of the type described in application Ser. No. 172,903, filed July 28, 1980 is shown for generating the on/off control signal and the offset current for use by the correction network shown in FIG. 4. The pertinent teachings of the latter application are incorporated herein by reference. Briefly, proportioned outputs of an R-Y demodulator 152 and a B-Y demodulator 154 are summed at a node 156 for application to a comparator comprising transistors 158, 160 and 162. The signal at node 156 is also coupled, via a voltage divider comprising resistors 164 and 165, to the input of a gated follower 166 which is turned on by a burst gate signal during the burst interval. Because A.C. color components are blanked from the signal at node 156 during the burst interval, the output of the follower 166 is a D.C. signal which is stored on a capacitor 168. The latter D.C. signal is smaller in amplitude than, but tracks with, the D.C. levels output by demodulators 152 and 154.

When and on/off switch 170 is in its illustrated open position, the D.C. signal on the capacitor 168 is coupled to the bases of transistors 160 and 162 for comparison with the signal present at node 156. When that comparison indicates that color correction is to take place, the transistor 160 conducts to supply operating current to the follower 140 (FIG. 4) via its collector lead 172. At the same time, the transistor 162 conducts to supply the offset current to the transistor 134 (FIG. 4) via is collector lead 174.

More specifically, when a broadcast signal contains no color components, the signal at node 156 will include no A.C. color-difference components but will include the D.C. bias level which is established by the demodulators 152 and 154. That D.C. bias level is, because of the effect of resistors 164 and 165, greater in amplitude than the D.C. signal received at the bases of transistors 160 and 162. Hence, under that condition, the transistor 158 wil be on and transistors 160 and 162 will be off so that the follower 140 (FIG. 4) is off and the transistors 134 receives no offset current.

When the broadcast signal includes fleshtone hues of a sufficient amplitude, the A.C. component of the signal at node 156 has a negative polarity which causes the instantaneous amplitude of the signal at node 156 to be smaller in magnitude than the value of the D.C. signal at the bases of the transistors 160 and 162. Under that condition, the transistor 158 is turned off and transistors 160 and 162 are turned on for supplying operating current to the follower 140 and for providing an offset current to the transistor 134. With this arrangement, the color corrector of FIG. 4 is activated when the hues of broadcast color signals are within plus or minus approximately 90 degrees of the fleshtone axis.

Figure 6:
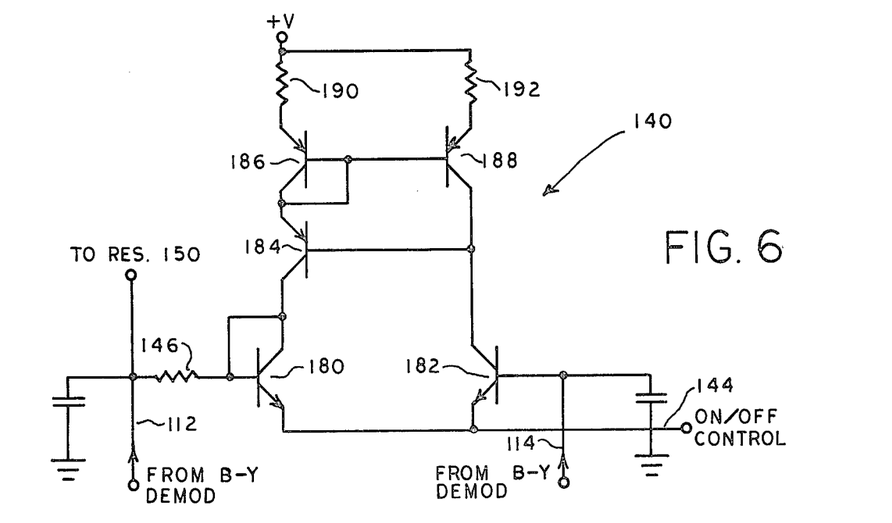
FIG. 6 is a circuit diagram of a preferred form of the voltage follower shown in FIG. 4.

Referring now to FIG. 6, a preferred form of the voltage follower 140 (FIG. 3) is shown. In this embodiment, the follower includes a pair of emitter-coupled transistors 180 and 182, and a current mirror comprising transistors 184, 186 and 188, and a pair of resistors 190 and 192. The emitters of the transistors 180 and 182 receive operating current via the lead 144 from the collector of transistor 160 (FIG. 5). The base of the transistor 182 is coupled to the lead 114 which carries B-Y current from the demodulator, and the collector of transistor 182 is coupled to the collector of the transistor 188 and to the base of transistor 184.

The emitters of transistors 188 and 190 are coupled to the supply voltage via the resistors 190 and 192, and the collector of the transistor 186 is coupled to its own base and to the emitter of the transistor 184. The collector of the latter transistor is coupled to the collector of the transistor 180. With this arrangement, the collector current of the transistor 182 varies according to the B-Y signal at the lead 114, and a similar current is mirrored to the collector of the transistor 180.

The base of the transistor is coupled to its collector and to the resistor 146. Hence, a B-Y voltage is developed across the resistor 146 for summation with the B-Y signal received via the lead 112.

It will be appreciated that the correction network shown in FIG. 4 operates in a manner similar to that of the correction network of FIG. 2 in the sense that both cause the effective gain of the B-Y demodulator to be reduced when color correction is desired. In addition, both correctors employ an offset signal for offsetting the reduced amplitude B-Y signal toward the fleshtone axis.

Although the invention has been described with reference to a preferred circuit arrangement, it will be obvious to those skilled in the art in light of this disclosure that many alterations and modifications may me made to the preferred arrangement without departing from the invention. Accordingly, it is intended that all such modifications and alterations be included within the spirit and scope of the invention as defined by the appended claims.

What is claimed is:

1. In a color television receiver having at least a B-Y demodulator for developing a pair of color-difference output signals of opposite polarity, and having a network for sensing color-difference signals representative of hues within a range of fleshtones, a color correction circuit comprising:
   means coupled to opposite polarity outputs of the B-Y demodulator and responsive to the sensing of color-difference signals within said fleshtone range for combining a selected portion of one B-Y color-difference signal with the opposite polarity B-Y color-difference signal so as to develop a resultant B-Y signal of a reduced amplitude; and
   means responsive to the sensing of color-difference signals within said fleshtone range for adding an offset signal to the resultant B-Y signal such that demodulated color signals occurring within the fleshtone range are offset toward the fleshtone axis.

2. A color correction circuit as set forth in claim 1 wherein said combining means includes a voltage follower receiving a B-Y color-difference signal of one polarity from the demodulator and means for summing the output of the voltage follower with a B-Y color-difference signal of the opposite polarity from the demodulator.

3. In a color television receiver having at least a B-Y demodulator for developing a pair of color-difference outputs of opposite polarity, having at least one current mirror receiving one of the demodulator's outputs for mirroring a color-difference current of a first polarity to an output terminal, having at least a second current mirror receiving the other one of the demodulator's outputs for mirroring a color-difference current of a second polarity to the output terminal, and having an enabling network for sensing color-difference signals representative of hues within a range of fleshtones, a color correction circuit, comprising:
   a voltage follower adapted to be turned on by the enabling network and having an input receiving one of the color-difference outputs of the demodulator for developing an output voltage of the same polarity as the follower's input; and
   means for summing the output of the follower with the other output of the demodulator such that said one current mirror receives a reduced amplitude B-Y signal and therefore develops a reduced amplitude B-Y signal at the output terminal.

4. A color correction circuit as set forth in claim 3 including means responsive to the enabling network for applying an offset current to the output terminal so as to shift the effective phase of the voltage thereat toward the fleshtone axis.

5. A color correction circuit as set forth in claim 3 wherein said voltage follower includes first and second emitter-coupled transistors whose emitters are coupled to the enabling network and whose collectors are coupled to a current mirror, the base of said first transistor receiving one of the color-difference outputs of the demodulator, and the base of said second transistor being coupled to its collector and to the other output of the demodulator.

* * * * *